(12) United States Patent
Wilson et al.

(10) Patent No.: US 9,008,989 B2
(45) Date of Patent: Apr. 14, 2015

(54) WIRELESS CONTROLLER

(75) Inventors: Andrew Wilson, Seattle, WA (US); David Russo, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 13/462,616

(22) Filed: May 2, 2012

(65) Prior Publication Data

US 2013/0297246 A1 Nov. 7, 2013

(51) Int. Cl.
*G01P 15/14* (2013.01)
*G06F 19/00* (2011.01)
*G06F 3/0346* (2013.01)
*A63F 13/20* (2014.01)

(52) U.S. Cl.
CPC .............. *G06F 3/0346* (2013.01); *A63F 13/20* (2013.01)

(58) Field of Classification Search
CPC ......... A63F 13/06; A63F 13/20; A63F 20/06; A63F 2300/1018; A63F 2300/105; A63F 2300/1093; A63F 2300/405; A63F 2300/6045
USPC ........... 702/104, 141; 324/629; 348/169, 734; 361/679.01; 463/37, 38
See application file for complete search history.

(56) References Cited

U.S. PATENT DOCUMENTS

| | | | |
|---|---|---|---|
| 6,544,124 B2 | 4/2003 | Ireland et al. | |
| 7,683,883 B2 | 3/2010 | Touma et al. | |
| 7,931,535 B2 | 4/2011 | Ikeda et al. | |
| 8,866,495 B2 * | 10/2014 | Baarman et al. | 324/629 |
| 2009/0203444 A1 | 8/2009 | Kim | |
| 2010/0149341 A1 | 6/2010 | Marks et al. | |
| 2011/0178707 A1 | 7/2011 | Sachs et al. | |

OTHER PUBLICATIONS

Nasiri, et al., "Selection and integration of MEMS-based motion processing in consumer apps", Retrieved at http://invensense.com/mems/gyro/documents/whitepapers/Selection-and-integration-of-MEMS-based-motion-processing-in-consumer-apps-070809-EE-Times.pdf, Jul. 8, 2009, pp. 1-7.

"G2 Motion Sensor", Retrieved at <<http://www.aichi-mi.com/3_products/catalog%20e.pdf>>, Nov. 5, 2010, pp. 3-15.

* cited by examiner

*Primary Examiner* — John H Le
(74) *Attorney, Agent, or Firm* — Brandon Roper; Judy Yee; Micky Minhas

(57) ABSTRACT

A computing device receives acceleration information from an accelerometer mechanically coupled to a wireless controller, magnetic bearing information from a magnetometer mechanically coupled to the wireless controller, and rotation information from a gyroscope mechanically coupled to the wireless controller. When the wireless controller is primarily vertical, the computing device determines a rotation angle of the wireless controller by filtering the rotation information using the acceleration information. When the wireless controller is primarily horizontal, the computing device determines the rotation angle of the wireless controller by filtering the rotation information using the magnetic bearing information.

20 Claims, 3 Drawing Sheets

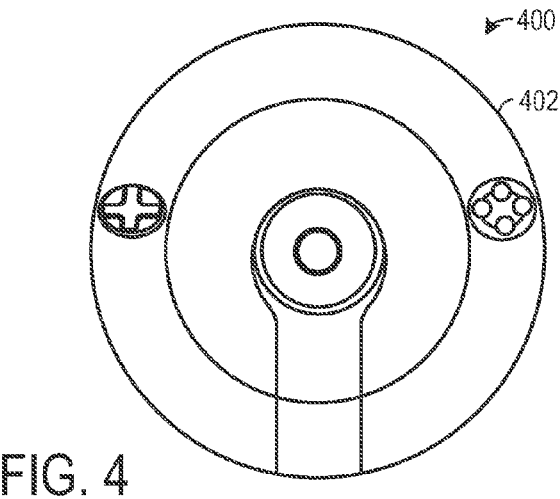

FIG. 4

```
                                                              ┌─500
┌──────────────────────────────────────────────────────────────────┐
│  RECEIVE SENSOR DATA FROM WIRELESS GAME CONTROLLER, THE      502 │
│  SENSOR DATA REPRESENTING ONE OR MORE OF ROTATION INFORMATION,   │
│  ACCELERATION INFORMATION, AND MAGNETIC BEARING INFORMATION      │
│  MEASURED BY WIRELESS GAME CONTROLLER                            │
└──────────────────────────────────────────────────────────────────┘
                              │
                              ▼
┌──────────────────────────────────────────────────────────────────┐
│    MAINTAIN ROTATION OF WIRELESS GAME CONTROLLER ABOUT      504  │
│    STEERING AXIS AS NEUTRAL STEERING ROTATION OF WIRELESS        │
│    GAME CONTROLLER                                               │
└──────────────────────────────────────────────────────────────────┘
                              │
                              ▼
┌──────────────────────────────────────────────────────────────────┐
│   USE ROTATION INFORMATION INFORMATION TO RECOGNIZE STEERING 506 │
│   ROTATION OF WIRELESS GAME CONTROLLER ABOUT THE STEERING        │
│   AXIS RELATIVE TO NEUTRAL STEERING ROTATION                     │
│  ┌────────────────────────────────────────────────────────────┐  │
│  │   USE ACCELERATION INFORMATION WHEN WIRELESS GAME     508  │  │
│  │   CONTROLLER HAS FIRST ORIENTATION                         │  │
│  └────────────────────────────────────────────────────────────┘  │
│  ┌────────────────────────────────────────────────────────────┐  │
│  │   USE MAGNETIC BEARING INFORMATION WHEN WIRELESS GAME 510  │  │
│  │   CONTROLLER HAS SECOND ORIENTATION                        │  │
│  └────────────────────────────────────────────────────────────┘  │
└──────────────────────────────────────────────────────────────────┘
                              │
                              ▼
┌──────────────────────────────────────────────────────────────────┐
│     STEER OBJECT IN PROPORTION TO STEERING ROTATION         512  │
└──────────────────────────────────────────────────────────────────┘
```

FIG. 5

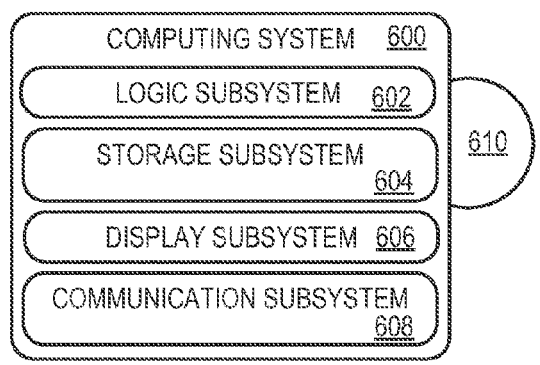

FIG. 6

WIRELESS CONTROLLER

BACKGROUND

Computing devices, and applications executed thereby, may be controllable via various input devices. In order to provide an enhanced user experience, some input devices may be configured to emulate real-world devices. For example, a virtual vehicle in a racing game may be controllable via a wheel controller configured to mimic a vehicle steering wheel.

SUMMARY

A computing device receives acceleration information from an accelerometer mechanically coupled to a wireless controller, magnetic bearing information from a magnetometer mechanically coupled to the wireless controller, and rotation information from a gyroscope mechanically coupled to the wireless controller. When the wireless controller is primarily vertical, the computing device determines a rotation angle of the wireless controller by filtering the rotation information using the acceleration information. When the wireless controller is primarily horizontal, the computing device determines the rotation angle of the wireless controller by filtering the rotation information using the magnetic bearing information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows a wireless controller according to an embodiment of the present disclosure.

FIG. 5 shows a process flow depicting an embodiment of a method for using a wireless controller.

FIG. 6 shows a non-limiting computing device in accordance with an embodiment of the present disclosure.

DETAILED DESCRIPTION

Similar to traditional vehicle steering wheels, typical wheel controllers for video games are configured such that the wheel portion is mechanically coupled to a fixed base along the steering axis. While such controllers may provide a realistic driving experience, such controllers are typically bulky and, in some scenarios, may require a table and/or other surface to provide a mount for the controller.

Accordingly, embodiments are disclosed herein that relate to a wireless controller lacking external support that may be manipulable to any orientation, while still maintaining performance comparable to fixed-mount wheels. In other words, a given rotation about the steering axis may effect a corresponding output (e.g., manipulation of an on-screen vehicle) regardless of the orientation of the steering axis in 3D space. Further, said wireless controller may be configured to provide such a user experience without requiring any active user calibration (e.g., holding in a pre-defined position, performing a pre-defined motion, etc.). In other words, a user may be able to pick up the controller, take any position, and begin using the controller without performing any active calibration.

Figure 1:
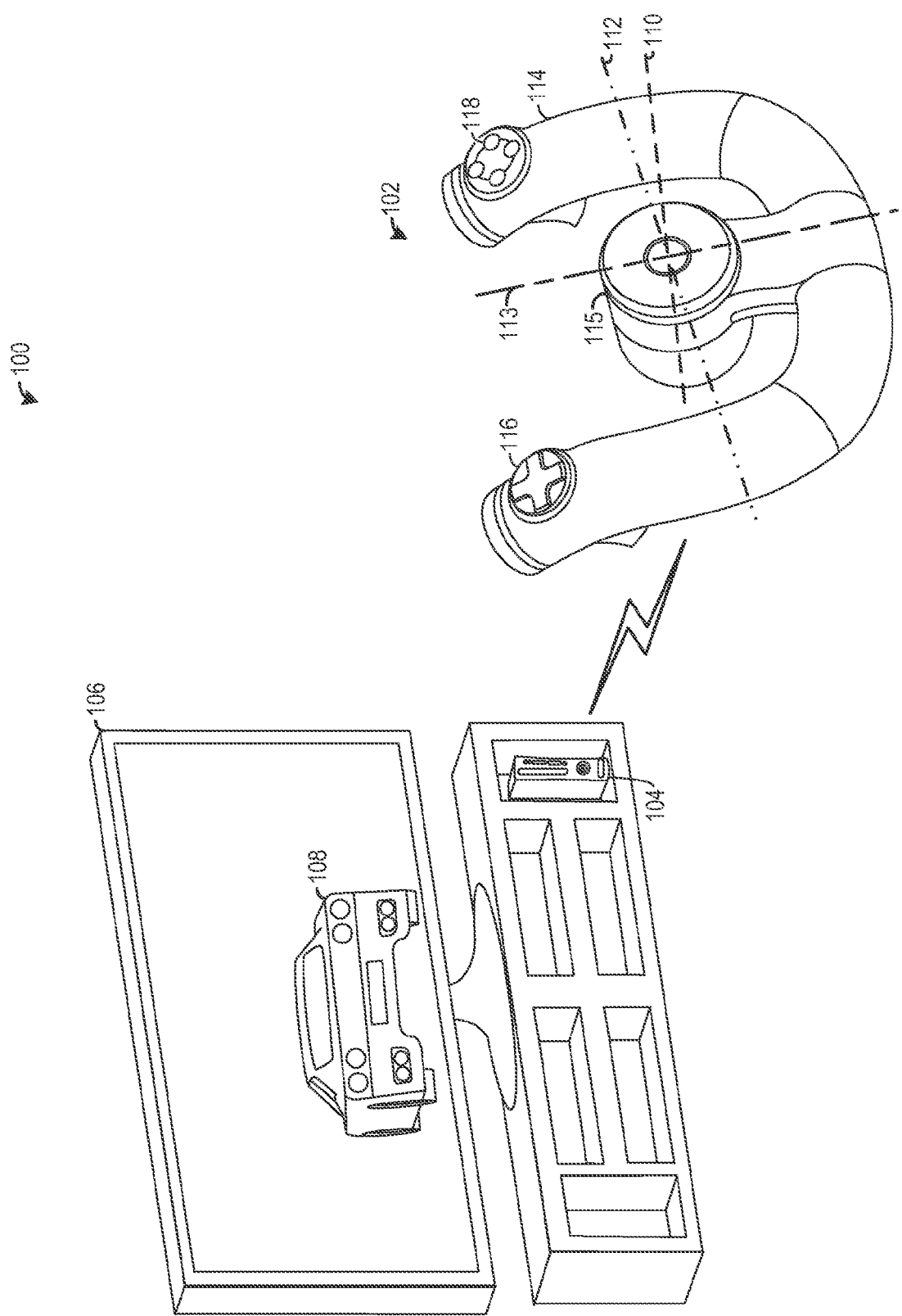
FIG. 1 shows an embodiment of an example use environment for using a wireless controller.

FIG. 1 shows an embodiment of an example use environment 100 for using a wireless controller 102. Environment 100 comprises computing device 104 operatively coupled to display device 106. Computing device 104 may be configured to execute an application program (e.g., racing game) comprising rendered object 108 (e.g., a vehicle) for output via display device 106. Controller 102 is configured to wirelessly communicate steering commands to computing device 104 such that manipulation of controller 102 effects an associated manipulation of rendered object 108. For example, clockwise rotation of controller 102 about steering axis 110 may effect a rightward turn of object 108.

It will be understood that a racing game scenario is presented for the purpose of example, and is not intended to be limiting in any manner. For example, in other embodiments, rendered object 108 may comprise a plane rendered by a flight simulation game, and thus rotation of controller 102 about pitch axis 112 may effect a corresponding upward or downward pitch of object 108. In yet other embodiments, rotation of controller 102 about yaw axis 113 may effect a manipulation of rendered object 108. It will be appreciated that motion of controller 102 may be detectable along any one or more degrees of freedom "DOF" and that said motion may effect any suitable control over computing device 104 without departing from the scope of the present disclosure.

As illustrated, controller 102 further comprises U-shaped handle 114 (e.g., yoke wheel) coupled to hub 115 and configured to be held in one or both hands by the game player. This is not mean to be limiting in any way. In other embodiments, handle 114 may comprise a substantially circular (e.g., O-shaped) configuration, as illustrated in FIG. 4, for example. In still other embodiments, a game controller may take virtually any shape and/or may be integrated into another device, such as a handheld mobile device. Controller 102 may optionally comprise directional input mechanism 116 (e.g., directional pad, joystick, etc.), input mechanisms 118 (e.g., buttons, triggers, etc.), and/or other user controls. It will be understood that this configuration is presented for the purpose of example, and that a wireless controller may have any suitable configuration without departing from the scope of the present disclosure.

As mentioned above, typical wheel controllers are configured such that the handle (e.g., handle 114) is mechanically coupled to a hub (e.g., hub 115) along the steering axis (e.g., steering axis 110), and the hub is permanently connected to a fixed base. Accordingly, in such scenarios, manipulation of the wheel is substantially constrained to rotation about the steering axis. Determining the amount of rotation, and thus the amount of control to effect on the rendered object (e.g., object 108) may thus merely comprise measuring rotation of the wheel about the steering axis (e.g., via rotary encoder or other suitable mechanism).

However, it will be appreciated that controller 102 may be manipulable to any suitable orientation. In other words, controller 102 may have any orientation during gameplay. For example, controller 102 may be held with steering axis 110 pointing down (referred to herein as "bus mode"), with yaw axis 113 pointing down, or with any orientation therebetween. It will be further appreciated that axes 110, 112, and 113 may have any suitable orientation relative to display device 106 during use.

Regardless of orientation, controller 102 may be configured to measure rotation about steering axis 110 such that the resulting measurement is substantially independent of controller orientation. In other words, controller 102 may be configured to interpret a given rotation about steering axis 110 regardless of the orientation of said axis in 3-D space. In this way, a substantially consistent user experience may be provided regardless of the user's position (e.g., lying on a couch, upright and facing the display, etc.).

Figure 2:
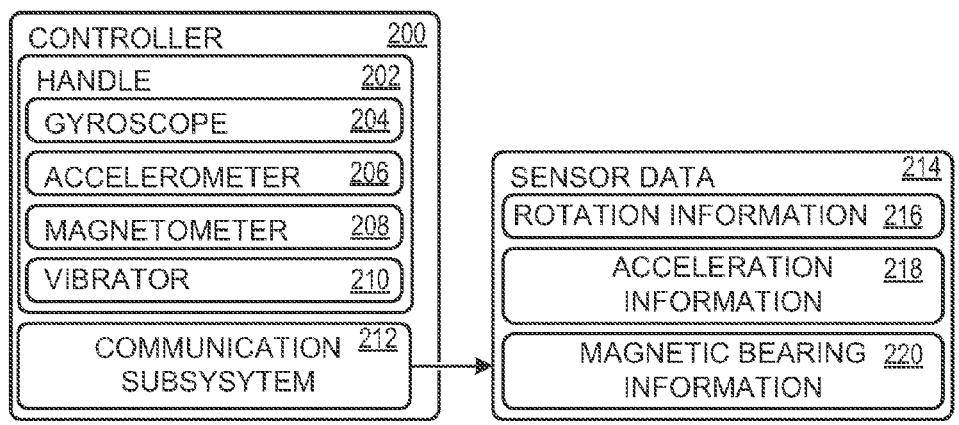
FIG. 2 schematically shows a non-limiting wireless controller in accordance with an embodiment of the present disclosure.

FIG. 2 schematically shows a non-limiting controller 200 in accordance with an embodiment of the present disclosure. Controller 200 comprises handle 202 (e.g., handle 114 of FIG. 1) configured to be held in one or both hands by a game player. Controller 200 further comprises gyroscope 204, accelerometer 206, and magnetometer 208, each of which may be mechanically coupled to handle 202. For example, handle 202 may comprise a substantially hollow body such that gyroscope 204, accelerometer 206, and magnetometer 208 may be disposed at least partially within said body. In other embodiments, one or more of gyroscope 204, accelerometer 206, and magnetometer 208 may be at least partially oriented within a hollow body (e.g., hub 115) mechanically coupled to handle 202.

In some embodiments, controller 200 may further comprise vibrator 210 coupled to handle 202 and configured to effect vibration of controller 200 (e.g., coinciding with in-game events, etc.). Accordingly, determining rotation of controller 200 about the steering axis (e.g., steering axis 110 of FIG. 1) may comprise ignoring motion induced by vibrator 210, as such motion may be measurable by one or more of gyroscope 204, accelerometer 206, and magnetometer 208.

Controller 200 further comprises communication subsystem 212 to wirelessly transmit sensor data 214 to a computing device (e.g., computing device 104 of FIG. 1) in order to effect control over the computing device. Sensor data 214 may represent one or more of rotation information 216, acceleration information 218, and magnetic bearing information 220, which are output by gyroscope 204, accelerometer 206, and magnetometer 208, respectively. Controller 200 may optionally include additional sensors (e.g., directional input mechanism 116 and input mechanisms 118 of FIG. 1) and sensor data 214 may represent button pushes and/or other detected user inputs.

Sensor data 214 may take any suitable form. For example, sensor data 214 may comprise "raw" data that may then be processed by the computing device. In other embodiments, sensor data 214 may comprise a steering rotation of controller 200 about the steering axis. In other words, computations may be performed onboard, and sensor data 214 may include information that is directly usable to manipulate a rendered object (e.g., rendered object 108 of FIG. 1).

Rotation of controller 200 about the steering axis and/or other manipulations of controller 200 may be detectable via gyroscope 204, accelerometer 206, magnetometer 208, or combinations thereof. However, each of these sensors may be characterized by innate limitations. Such limitations may be overcome by intelligently and cooperatively utilizing information from two or more sensors, as discussed below.

Gyroscope 204 may optionally be a single-axis gyroscope configured to measure rotation about a steering axis (e.g., steering axis 110 of FIG. 1). In other embodiments, gyroscope 204 may be configured to detect rotation along different and/or additional axes. However, merely determining rotation via gyroscope 204 may not provide a satisfying user experience. For example, gyroscopes are typically configured to measure angular velocity, and therefore determining an amount of rotation via the gyroscope may comprise computing an integral of the gyroscope output (e.g., rotation information 216). Due to various factors (e.g., numerical precision, environmental variations, gyroscope saturation, etc.), the determined rotation may begin to "drift" over time, thus resulting in increasingly inaccurate results. For example, gyroscopic drift may result in a change in position of the rendered object (e.g., object 108 of FIG. 1) even when the controller is substantially motionless and held in what the user perceives to be a neutral position.

Accordingly, accelerometer 206 may be configured to output acceleration information 218 to provide a reference point for interpreting rotation information 216. In this way, acceleration information 218 may be usable to correct the drift of gyroscope 204 when controller 200 is primarily vertical (i.e., when not in bus mode). Accelerometers may be configured to measure acceleration, and therefore acceleration information 218 may be usable to orient controller 200 relative to earth's gravitational field (e.g., displacement from gravity vector). In other words, acceleration information 218 may be usable to absolutely orient the relative measurement of rotation information 216. However, as accelerometers are configured to measure any acceleration, motion (e.g., lateral and/or up-and-down) of controller 200 may be incorrectly interpreted as a change in orientation. As such, the validity of acceleration information 218 may be determined before incorporating said information into the computation of the rotation angle.

It will be appreciated that accelerometer 206 may only be useful in determining orientation when controller 200 is primarily vertical (e.g., illustrated orientation of controller 102). When controller 200 is primarily horizontal (e.g., steering axis 110 parallel to gravity), acceleration information 218 may remain substantially unchanged regardless or rotation about the steering axis. In other words, acceleration information 218 may not provide suitable information for correcting the imprecision of rotation information 216 when controller 200 is primarily horizontal because the steering axis is parallel with gravity.

Accordingly, magnetometer 208 may be configured to output magnetic bearing information 220 to provide a reference point for interpreting rotation information 216 when controller 200 is primarily horizontal. The magnetic bearing information 220 may be usable to correct the drift of gyroscope 204 when controller 200 is primarily horizontal. For example, typical magnetometers may be configured to determine direction of the earth's magnetic field, and may therefore be configured to detect orientation of controller 200 relative to said field. In this way, magnetic bearing information 220 may be usable to absolutely orient the relative measurement of rotation information 216. It will be appreciated that in some scenarios (e.g., at earth's magnetic poles), the direction of the magnetic field may be substantially equivalent to the direction of the gravitational field. Accordingly, in such scenarios, one or more sensors may be used instead of, or in addition to, magnetometer 208 in order to determine orientation when the controller is primarily horizontal.

In view of the above, a more general mechanism for determining rotation angle of controller 200 may be described as follows. Rotation information 216 may provide a reliable change in rotation angle. However, due to the characteristics of gyroscope 204 described above, gyroscope 204 may not always be usable to determine absolute orientation. It may therefore be beneficial to utilize gyroscope 204 to provide a reliable change in rotation angle, while utilizing accelerometer 206 and/or magnetometer 208 to provide an absolute estimate of rotation angle. Accordingly, one or more of acceleration information 218 and magnetic bearing information 220 may be intelligently incorporated (e.g., via a Kalman filter as discussed below) into calculation of rotation angle.

While the discussion is directed towards using an accelerometer and/or a magnetometer to absolutely orient the relative rotation measured by the gyroscope about a steering axis (e.g., steering axis 110 of FIG. 1), it will be appreciated that similar mechanisms may be utilized to determine rotation about any DOF (e.g., pitch axis 112 and/or yaw axis 113 of FIG. 1).

It will be appreciated that although references are made herein to a wireless controller comprising two orientations (i.e., "primarily horizontal" and "primarily vertical"), it will be understood that the two orientations comprise a range of orientations. For example, an orientation within 20 degrees of horizontal may be interpreted as "primarily horizontal." Accordingly, an orientation outside of said range may be interpreted as "primarily vertical." The definition of such orientations may be based on the capabilities of the various sensors. For example, a primarily vertical orientation may be any orientation in which the accelerometer provides a more accurate reference than the magnetometer, and a primarily horizontal orientation may be any orientation in which the magnetometer provides a more accurate reference than the accelerometer. These scenarios are presented for the purpose of example, and any type and/or number of orientations may be defined without departing from the scope of the present disclosure.

It will be appreciated that the transition between a first orientation and a second orientation may be determined based on the current orientation. In other words, the angle to switch from a vertical orientation to a horizontal orientation may be different (e.g., farther from vertical) than the angle to switch from a horizontal orientation to a vertical orientation. For example, the controller may need to be oriented at least 30 degrees from horizontal to switch from the horizontal orientation to the vertical orientation, whereas the controller may need to be oriented within 15 degrees from horizontal to switch from the vertical orientation to the horizontal orientation. As typical user manipulation of the wireless controller about the steering axis may also effect a change in the orientation about the pitch axis or the yaw axis, such a mechanism may be desirable to ensure that the operating mode changes only when desired by the user.

Figure 3A:
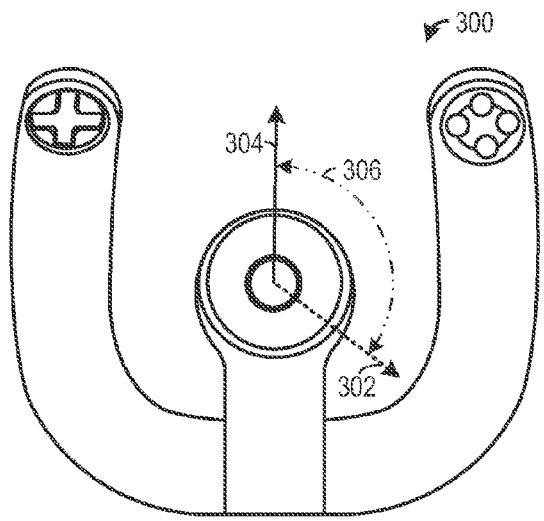
FIGS. 3A and 3B show a wireless controller rotating about a steering axis.
Figure 3B:
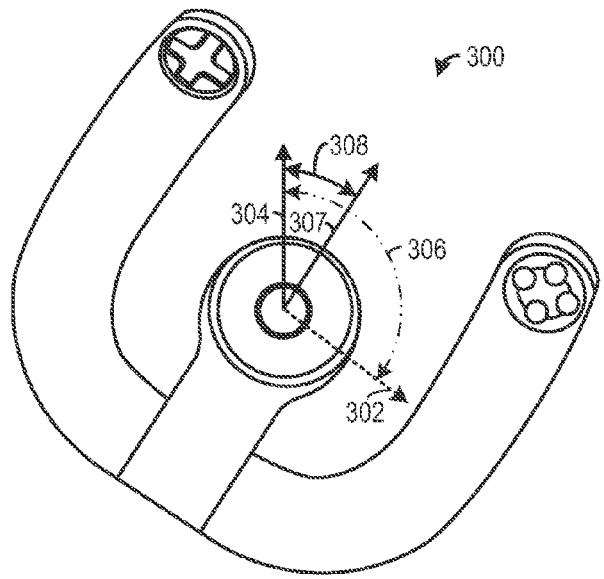

Turning now to FIGS. 3A and 3B, example manipulation of a wireless controller 300 (e.g., controller 102 of FIG. 1 or controller 200 of FIG. 2) is shown. FIG. 3A shows a top view of wireless controller 300 in a primarily horizontal orientation. Such an orientation may simulate driving a vehicle wherein the steering wheel is primarily horizontal (e.g., a bus). As described above, when the controller is primarily horizontal, magnetic bearing information from a magnetometer may be usable to determine a magnetic bearing 302. Magnetic bearing 302 may be further usable to determine neutral steering vector 304 which, as illustrated, is displaced from magnetic bearing 302 by angle 306. The neutral steering vector defines the controller orientation that corresponds to a straight ahead control without either left or right turning. Accordingly, the controller "turns" when the controller is rotated away from the neutral steering vector (e.g., controller's yaw axis not parallel with neutral steering vector). It will be appreciated that magnetic bearing 302, neutral steering vector 304, and angle 306 are illustrated as being substantially planar for the ease of understanding, and that magnetic bearing 302, neutral steering vector 304, and angle 306 may comprise any suitable orientation within 3D space. It will be further appreciated that neutral steering vector 304 may have any suitable orientation relative to the computing device (e.g., computing device 104) and the display device (e.g., display device 106). For example, neutral steering vector 304 may point directly at the display device. However, such a neutral steering vector is not required. In general, what the user perceives as a straight-ahead controller orientation may be estimated, and the neutral steering vector may be set to match this orientation.

FIG. 3B shows controller 300 after the controller's yaw axis 307 has been rotated clockwise by rotation angle 308 (also referred to as a steering angle). Rotation angle 308 may therefore represent displacement of controller 300 from neutral steering vector 304. In other words, rotation angle 308 may represent a steering rotation of controller 300 about the steering axis. Accordingly, controller 300 may be configured to effect control of a rendered object based on rotation angle 308. For example, in racing game scenarios, the vehicle may turn to the right based on rotation angle 308.

As introduced above, neutral steering vector 304 may be identified and maintained using magnetic bearing 302 when controller 300 is primarily horizontal. Similarly, neutral steering vector 304 may be identified and maintained using acceleration information when controller 300 is primarily vertical.

Further, in some embodiments, the acceleration information may be used to correct the magnetic bearing information. For example, when controller 300 is oriented in the horizontal regime, but is not completely horizontal (e.g., 10 degree incline), the acceleration information may be used to adjust the magnetic bearing information (e.g., projecting magnetic bearing 302 onto a horizontal plane).

In general terms, the rotation angle (e.g., rotation angle 308) of the controller may be calculated according to the following equation, $$\theta_t = \theta_{t-1} + \omega dt.$$

Here, $\theta_t$ equals 0 when the controller is aligned with the neutral rotation vector. The rotation angle $\theta_t$ (e.g., rotation angle 308) may be determined based on a previous state of the rotation angle $\theta_{t-1}$ and an angular velocity ($\omega$) measured by the gyroscope. However, as described above, determining the rotation angle based only on the gyroscope may result in an unsuitable user experience. Accordingly, the absolute estimate of orientation (e.g., via one or more of accelerometer 206 and magnetometer 208 of FIG. 2) may be used to adjust the measured change in rotation angle (e.g., via rotation information 216 of FIG. 2). For example, the rotation information from the gyroscope may be updated by a fraction of the difference between the absolute estimate and the rotation information, thereby more heavily relying on gyroscope output than the accelerometer output or the magnetometer output.

While discussed above in the context of a U-shaped handle, it is to be understood that wireless controllers may have virtually any shape without departing from the scope of this disclosure. As another nonlimiting example, FIG. 4 shows a wireless controller 400 including a substantially circular handle 402 configured to be held in one or both hands by the game player.

Turning now to FIG. 5, a process flow depicting an embodiment of a method 500 for using a wireless controller is shown. At 502, method 500 comprises receiving sensor data (e.g., sensor data 214 of FIG. 2) from the wireless controller. The sensor data may be received by computing device 104 of FIG. 1, for example. The sensor data may represent one or more of rotation information, acceleration information, and magnetic bearing information measured by the wireless controller. The rotation information, the acceleration information, and the magnetic bearing information may be output by a gyroscope, an accelerometer, and a magnetometer, respectively, each of which may be mechanically coupled to the wireless controller. As mentioned above, the sensor data may comprise any suitable representation including, but not limited to, "raw" sensor data and/or data computed therefrom (e.g., rotation angle 308 of FIG. 3B).

At 504, method 500 comprises identifying and maintaining a neutral steering vector (e.g., neutral steering vector 304 of FIG. 3A) of the wireless controller. As mentioned above, the wireless controller, and thus the steering axis, may have virtually any suitable default orientation. In other words, because the wireless controller is not fixed in any particular orientation by a mechanical base, a user may hold the wireless controller with any orientation. Furthermore, any of the orientations that the user can hold the controller could be the orientation that the user believes to be the neutral orientation, i.e., the orientation that should not cause a controlled virtual vehicle to turn.

As mentioned above, the neutral steering vector may be determined without requiring any active user calibration and may be determined such that said determination does not result in substantial discontinuities in position of the rendered object. Although the controller may be manipulable to any position, in some embodiments the neutral steering vector may be identified/maintained from a plurality of pre-defined neutral steering vectors. For example, a first pre-defined neutral steering vector may be set with the assumption that when the wireless game control is oriented primarily vertical in an "up" position (e.g., as illustrated by controller 102 of FIG. 1), the neutral steering vector should be set to point straight up (as determined via the accelerometer). In other words, when the wireless controller is primarily vertical, control effected by manipulation of the wireless controller may be symmetric with respect to gravity.

Furthermore, it may be useful to assume that a user moving the wireless controller from the primarily vertical orientation to the primarily horizontal orientation may do so such that the neutral steering vector remains in the same plane. Accordingly, in some embodiments, the neutral steering vector computed for the previous orientation (e.g., primarily vertical) may be usable to determine the neutral steering vector for the current orientation (e.g., primarily horizontal). In other words, the neutral steering position may be "handed off" to the new orientation. For example, upon detecting a change in orientation from a primarily vertical orientation to a primarily horizontal orientation, the neutral steering vector may be identified based on the magnetic bearing information from the magnetometer at that time and on the previously computed neutral steering vector. However, as the change in orientation may not occur when the controller is not substantially horizontal (e.g., occurs at 30 degrees to the horizontal), the magnetic bearing information may be adjusted based on the acceleration information. For example, in some embodiments, the magnetic bearing information may be adjusted in order to determine the orientation of the wireless controller on a horizontal plane.

In other embodiments, the neutral steering vector may be determined via different mechanisms. For example, upon startup, the neutral steering vector may be identified based on the attitude of the controller at that time. Similarly, the neutral steering vector may be identified upon determining that the wireless controller has remained stationary for a period of time. For example, if the controller has remained motionless for 2 seconds, it may be assumed that the orientation of the game controller reflects what the user considers the "straight-ahead" position, and thus the neutral steering vector may be identified based on said attitude.

In yet other embodiments, the neutral steering vector may be identified with respect to an in-game event, or other trigger, generated by the computing device in communication with the wireless controller (e.g., computing device 104). For example, in a racing game scenario, the neutral steering vector may be identified based on the attitude of the controller when the race begins (e.g., when the brake is released and the throttle is activated at the beginning of the game). As another example in the racing game scenario, the neutral steering vector may be identified based on the attitude of the controller during a straight-away portion of a virtual race.

It will be understood that these scenarios are presented for the purpose of example, and the neutral steering vector may be identified according to any suitable mechanism or combination of mechanisms without departing from the scope of the present disclosure.

At 506, method 500 comprises using the rotation information to recognize a steering rotation of the wireless controller about the steering axis relative to the neutral steering vector. Recognizing the steering rotation may comprise determining an estimated rotation angle based on one or more of the acceleration information and the magnetic information. This estimated angle may then be filtered using the rotation information from the gyroscope in order to determine the rotation angle.

When it can be determined that the controller is primarily vertical, the acceleration information may be used to determine an estimated rotation angle at 508.

When it can be determined that the controller is primarily horizontal, the magnetic bearing information may be used to determine an estimated rotation angle at 510.

If it cannot be reliably determined if the controller is either primarily horizontal or vertical, the rotation information from the gyroscope may be used to determine an estimated rotation angle without considering magnetic bearing information and/or acceleration information.

Determining if the controller is horizontal or vertical may first comprise determining if the acceleration information from the accelerometer is valid. As mentioned above, the acceleration information may be usable to determine an orientation of the controller in 3D space with respect to gravity. However, accelerometers are configured to determine any acceleration (e.g., movement of the wireless controller), and are therefore not limited to detecting acceleration due to gravity.

Determining if the acceleration information is valid (i.e., usable to determine orientation) may comprise comparing the acceleration information to gravity. For example, if the difference between the acceleration information and gravity is within a threshold value (e.g., 0.4 m/s$^2$), the acceleration information may be considered valid. Determining if the acceleration information is valid may further comprise comparing one or more previous instances of acceleration information. In this way, it may be determined whether or not the controller has remained substantially motionless for a period of time, and thus the acceleration information may represent the orientation of the controller with respect to gravity.

Since the rotation information (e.g., change in rotation angle) from the gyroscope may be usable to more accurately determine the rotation angle, the estimated rotation angle may be filtered with the rotation information to determine the steering rotation of the wireless controller regardless of orientation. In other words, when the wireless controller is primarily vertical, the rotation information may be filtered using the acceleration information. Similarly, when the wireless controller is primarily horizontal, the rotation information may be filtered using the magnetic bearing information.

For example, a Kalman filter may be configured to utilize the information from the sensors along with the previous filter state as inputs to determine rotation of the controller. The previous output of the Kalman filter may be used as an input to the Kalman filter to smooth output and lessen any sudden changes that could result from erroneous inputs. Each of these inputs may be individually tuned such that the output of the Kalman filter utilizes the more reliable information without neglecting less reliable information. For example, the Kalman filter may comprise a covariance associated with each input, and therefore recognizing the steering rotation may further comprise updating one or more covariances. In this way, the Kalman filter may be configured to "smooth out" outlying or otherwise unreliable information to ensure that no sudden change in control is effected over the controlled object. For example, a Kalman filter may be adapted to determine rotation angle of a wireless controller as follows:

Before the first update, the Kalman filter parameters are initialized as follows:

$$H = \begin{bmatrix} 0 & 1 \\ 1 & 0 \end{bmatrix}$$

$$F = \begin{bmatrix} 1 & 0 \\ 0 & 1 \end{bmatrix}$$

$$Q = \begin{bmatrix} 0.01 & 0 \\ 0 & 0.01 \end{bmatrix}$$

$$R = \begin{bmatrix} 25 & 0 \\ 0 & 25 \end{bmatrix}$$

$$P_{k-1|k-1} = I$$

$$\hat{x}_{k-1|k-1} = 0.$$

It will be understood that the values of matrix Q (i.e., process noise model) and R (i.e., observation noise model), are presented for the purpose of example, and that said models may vary depending on the use case (e.g., sensor scaling, etc).

Next, for each time step thereafter, the Kalman filter observation $$z_k = \begin{bmatrix} \omega_k \\ \theta_k \end{bmatrix}$$

may be formed for gyroscope reading $\omega_k$ and wheel angle estimate $\theta_k$ (i.e., angle estimated from accelerometer or magnetometer).

Next, the Kalman update is executed as follows:

$$\hat{x}_{k|k-1} = F\hat{x}_{k-1|k-1}$$

$$P_{k|k-1} = FP_{k-1|k-1}F^T + Q$$

$$K_k = P_{k|k-1}H^T(HP_{k|k-1}H^T + R)^{-1}$$

$$\tilde{y}_k = z_k - H\hat{x}_{k|k-1}$$

$$\hat{x}_{k|k} = \hat{x}_{k|k-1} + K\tilde{y}_k$$

where the updated wheel angle is represented by the first element of $\hat{x}_{k|k}$.

As mentioned above, in some embodiments, the wireless controller may comprise a vibrator configured to effect vibration of the controller. Accordingly, recognizing the steering rotation may further comprise ignoring motion induced by the vibrator (e.g., by adjusting threshold values used to determine when the accelerometer value could be considered valid). As motion induced by the vibrator may be detectable by the accelerometer, ignoring such motion may comprise setting a threshold value for a comparison with acceleration information. For example, acceleration may be compared to known gravity information and/or to one or more previous comparisons. Accordingly, ignoring motion induced by the vibrator may comprise setting the threshold above an acceleration producible by the vibrator. In other embodiments, ignoring such motion may comprise setting additional and/or different thresholds. These scenarios are intended to be non-limiting, and ignoring motion induced by the vibrator may be provided via any suitable mechanism or combination of mechanisms.

Further, as described above, it may be desirable to restrict the amount of rotation about the steering axis to a rotational range (e.g., 90 degrees from center). Accordingly, recognizing the steering rotation may further comprise ignoring rotation outside of a rotational range. As the controller may be manipulable in any position, limiting recognized rotation may simplify determining the orientation of the controller. Limiting the rotation angle may also ensure that no undue strain is placed on the user. While discussion is directed towards limiting rotation about the steering axis, it will be appreciated that interpreted motion may be limited along different and/or DOF. Further, the amount by which motion is limited may be independent for each DOF and may further be user-definable in some embodiments.

Further, in some embodiments, recognizing a steering rotation may comprise performing a calibration of the gyroscope. For example, due to various factors (e.g., device fatigue, environmental factors, etc.), the rotation information output by the gyroscope may degrade, or otherwise vary, over time. However, as described above, requiring active user calibration may result in a suboptimal user experience.

It may therefore be beneficial to ensure that the controller has remained motionless for a period of time before calibrating the gyroscope. Accordingly, calibration may comprise determining whether or not the wireless controller has remained substantially motionless for a period of time (e.g., 1000 iterations) based on one or more of the acceleration information, the magnetic bearing information, and the rotation information. Since gyroscopes are configured to measure angular velocity, the rotation information output by the gyroscope when motionless may comprise a baseline value regardless of orientation. As such, if the game controller has remained substantially motionless for the period of time, calibration further comprises updating a bias of the gyroscope based on the rotation information.

At 512, method 500 comprises steering an object (e.g., object 108 of FIG. 1) in proportion to the steering rotation. In other embodiments, method 500 may comprise outputting the rotation angle via any suitable mechanism or combination of mechanisms.

While the discussion has been directed towards a gyroscope configured to output rotation information, an accelerometer configured to output acceleration information, and a magnetometer configured to output magnetic bearing information, it will be understood that any suitable combination of sensors and information may be utilized without departing from the scope of the present disclosure. Further, while the discussion has been directed towards using the wireless controller to effect control over a rendered vehicle in a racing game, it will be appreciated that the wireless controller described herein may be usable to effect any suitable control over a computing device for game or nongame purposes.

As another example, the wireless controller may be usable to control a rendered aircraft in a flight simulation game. In such embodiments, the attitude of the aircraft may change in proportion to (e.g., match or scale linearly or nonlinearly) the attitude of the controller. For example, rotation about the steering axis (e.g., axis 110 of FIG. 1) and the pitch axis (e.g., pitch axis 112 of FIG. 1) may be usable to determine the roll and pitch of the aircraft, respectively. Thus the aircraft may be inclined in proportion to the pitch of the wireless controller, and may be rolled in proportion to the steering rotation.

Utilizing the configuration of sensors described above, roll may be determined based on both the rotation information and the acceleration information. The acceleration information may be used to establish an absolute roll of the wireless controller when the controller is primarily vertical, and the magnetic bearing information may be used to establish an absolute roll of the wireless controller when the controller is primarily horizontal. Regardless of the orientation, the rotation information from the gyroscope may be used to establish a change in the roll.

In some embodiments, the pitch may be determined by the accelerometer directly. In other embodiments, pitch may be further based on the gyroscope (e.g., via use of gyroscope with additional DOF and/or inclusion of a second single-axis gyroscope orientated to measure changes in pitch). In such embodiments, the acceleration information may therefore be used to establish an absolute pitch of the wireless controller and the rotation information to establish a change in the pitch of the wireless controller.

In some embodiments, the virtual object may be turned in proportion to the yaw of the wireless controller. As with roll and pitch described above, rotation information may be used to recognize a change in the yaw of the wireless controller about a yaw axis. However, due to the orientation of the yaw axis, the magnetic bearing information may be used to determine absolute yaw when the controller is primarily vertical. Similarly, when the controller is primarily horizontal, the acceleration information may be used to determine an absolute yaw.

As discussed above, these scenarios are presented for the purpose of example, and manipulation of the wireless controller may be detectable along any DOF using any combination of sensors without departing from the scope of the present disclosure.

In some embodiments, the above described methods and processes may be tied to a computing system including one or more computing devices. In particular, the methods and processes described herein may be implemented as a computer application program, computer service, computer API, computer library, and/or other computer program product.

FIG. 6 schematically shows a non-limiting computing system 600 that may perform one or more of the above described methods and processes. Computing system 600 is shown in simplified form. It is to be understood that virtually any computer architecture may be used without departing from the scope of this disclosure. In different embodiments, computing system 600 may take the form of a home entertainment computer (e.g., computing device 104 of FIG. 1), mainframe computer, server computer, desktop computer, laptop computer, tablet computer, home entertainment computer, network computing device, mobile computing device, mobile communication device (e.g., smart phone), etc.

Computing system 600 includes logic subsystem 602 and storage subsystem 604. Computing system 600 may optionally include display subsystem 606, communication subsystem 608, and/or other components not shown in FIG. 6. Computing system 600 may include or interface with a wireless controller (e.g., wireless controller 102 of FIG. 1).

Logic subsystem 602 includes one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 604 includes one or more physical, non-transitory, devices configured to hold data and/or instructions executable by the logic subsystem to implement the herein described methods and processes. When such methods and processes are implemented, the state of storage subsystem 604 may be transformed (e.g., to hold different data).

Storage subsystem 604 may include removable media 610 and/or built-in devices. Storage subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and storage subsystem 604 may be integrated into one or more common devices, such as an application specific integrated circuit or a system on a chip.

It is to be appreciated that storage subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 600 that is implemented to perform one or more particular functions. In some cases, such a module, program, or engine may be instantiated via logic subsystem 602 executing instructions held by storage subsystem 604. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

When included, display subsystem 606 may be used to present a visual representation of data held by storage subsystem 604. This visual representation may take the form of a graphical user interface (GUI). As the herein described methods and processes change the data held by the storage subsystem, and thus transform the state of the storage subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, communication subsystem 608 may be configured to communicatively couple computing system 600 with one or more other computing devices. Communication subsystem 608 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The invention claimed is:

1. A computing storage subsystem storing instructions that are executable by a logic subsystem to:
   receive acceleration information from an accelerometer mechanically coupled to a wireless controller;
   receive magnetic bearing information from a magnetometer mechanically coupled to the wireless controller;
   receive rotation information from a gyroscope mechanically coupled to the wireless controller;
   when the wireless controller is primarily vertical, determine rotation angle of the wireless controller by filtering the rotation information using the acceleration information; and
   when the wireless controller is primarily horizontal, determine rotation angle of the wireless controller by filtering the rotation information using the magnetic bearing information.

2. The computing storage subsystem of claim 1, wherein filtering the rotation information comprises providing the rotation information to a Kalman filter with a previous output of the Kalman filter, the Kalman filter configured to output the rotation angle.

3. The computing storage subsystem of claim 2, wherein filtering the rotation information using the acceleration information further comprises providing the acceleration information to the Kalman filter.

4. The computing storage subsystem of claim 2, wherein filtering the rotation information using the magnetic bearing information further comprises providing the magnetic bearing information to the Kalman filter.

5. The computing storage subsystem of claim 2, wherein filtering the rotation information using the magnetic bearing information further comprises providing adjusted bearing information to the Kalman filter, the adjusted bearing information based on the magnetic bearing information and the acceleration information.

6. The computing storage subsystem of claim 2, wherein the instructions are further executable to update one or more covariances of the Kalman filter, the Kalman filter comprising a covariance associated with each input.

7. The computing storage subsystem of claim 1, wherein the instructions are further executable to:
   determine if the acceleration information is valid;
   if the acceleration information is valid, determine whether the wireless controller is substantially vertical or substantially horizontal based on the acceleration information; and
   if the acceleration information is not valid, determine the rotation angle based on the rotation information.

8. The computing storage subsystem of claim 7, wherein determining if the acceleration information is valid comprises comparing the acceleration information to gravity.

9. The computing storage subsystem of claim 8, wherein determining if the acceleration information is valid further comprises comparing one or more previous comparisons between the acceleration information and gravity.

10. The computing storage subsystem of claim 7, wherein the instructions are further executable to, if the acceleration information is valid, adjust the magnetic bearing information based on the acceleration information.

11. The computing storage subsystem of claim 1, wherein determining the rotation angle further comprises ignoring motion induced by a vibrator mechanically coupled to the wireless controller, the vibrator configured to effect vibration of the wireless controller.

12. The computing storage subsystem of claim 1, wherein determining the rotation angle further comprises ignoring rotation outside of a rotational range.

13. The computing storage subsystem of claim 1, wherein the instructions are further executable to calibrate a bias of the gyroscope by:
   determining whether or not the wireless controller has remained substantially motionless for a period of time based on one or more of the acceleration information, the magnetic bearing information, and the rotation information; and
   if the wireless controller has remained substantially motionless for the period of time, updating the bias of the gyroscope based on the rotation information.

14. The computing storage subsystem of claim 1, wherein the instructions are further executable to output the rotation angle.

15. A computing storage subsystem storing instructions that are executable by a logic subsystem to:
   receive first information from a first sensor mechanically coupled to a wireless controller;
   receive second information from a second sensor mechanically coupled to the wireless controller;
   receive third information from a third sensor mechanically coupled to the wireless controller;
   when the wireless controller has a first orientation, determine rotation angle of the wireless controller by filtering the third information using the first information; and when the wireless controller has a second orientation, determine rotation angle of the wireless controller by filtering the third information using the second information.

16. The computing storage subsystem of claim 15, wherein filtering the third information comprises providing the third information to a Kalman filter with a previous output of the Kalman filter and one or more of the first information and the second information, the Kalman filter configured to output the rotation angle.

17. A computing storage subsystem storing instructions that are executable by a logic subsystem to:
- receive acceleration information from an accelerometer mechanically coupled to a wireless controller;
- receive magnetic bearing information from a magnetometer mechanically coupled to the wireless controller;
- receive rotation information from a gyroscope mechanically coupled to the wireless controller;
- when the wireless controller is primarily vertical, determine an estimated rotation angle of the wireless controller using the acceleration information; and
- when the wireless controller is primarily horizontal, determine an estimated rotation angle of the wireless controller using the magnetic bearing information.

18. The computing storage subsystem of claim 17, wherein the instructions are further executable to determine a rotation angle of the wireless controller based on the estimated rotation angle and the rotation information by providing the estimated rotation angle and the rotation information to a Kalman filter with a previous output of the Kalman filter, the Kalman filter configured to output the rotation angle.

19. The computing storage subsystem of claim 18, wherein the instructions are further executable to update one or more covariances of the Kalman filter, the Kalman filter comprising a covariance associated with each input.

20. The computing storage subsystem of claim 18, wherein the instructions are further executable to:
- determine if the acceleration information is valid by comparing the acceleration information to one or more of gravity and a previous instance of the acceleration information;
- if the acceleration information is valid, determine whether the game-controller is substantially vertical or substantially horizontal based on the acceleration information; and
- if the acceleration information is not valid, determine the estimated rotation angle based on the rotation information.

* * * * *